United States Patent
Hsieh et al.

(10) Patent No.: US 7,237,941 B2
(45) Date of Patent: Jul. 3, 2007

(54) BACKLIGHT MODULE WITH URGED LIGHT GUIDE PLATE AND LIQUID CRYSTAL DISPLAY HAVING SAME

(75) Inventors: Yu-Chih Hsieh, Miao-Li (TW); Ming-Chiang Yu, Miao-Li (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 9 days.

(21) Appl. No.: 11/301,007

(22) Filed: Dec. 12, 2005

(65) Prior Publication Data
US 2006/0126362 A1 Jun. 15, 2006

(30) Foreign Application Priority Data
Dec. 10, 2004 (TW) ............................... 93219897 U

(51) Int. Cl.
*F21V 7/04* (2006.01)
(52) U.S. Cl. .................................................. 362/633
(58) Field of Classification Search ................. 362/633
See application file for complete search history.

(56) References Cited

U.S. PATENT DOCUMENTS

| | | | |
|---|---|---|---|
| 6,245,191 B1 | 6/2001 | Derderian et al. | |
| 6,561,664 B2 * | 5/2003 | Yachi et al. | 362/615 |
| 6,855,640 B2 | 2/2005 | Wang et al. | |
| 6,929,392 B2 * | 8/2005 | Kim et al. | 362/632 |
| 6,950,154 B2 * | 9/2005 | Lee | 349/58 |

FOREIGN PATENT DOCUMENTS

| | | | |
|---|---|---|---|
| JP | 2003234010 A | * | 8/2003 |
| JP | 2004055454 A | * | 2/2004 |

* cited by examiner

Primary Examiner—Ali Alavi
Assistant Examiner—Hargobind S. Sawhney
(74) Attorney, Agent, or Firm—Wei Te Chung

(57) ABSTRACT

A backlight module (5) includes a light guide plate (56) having an incident surface (563), a frame (55) for accommodating the light guide plate, and a light source (59) accommodated in the frame and disposed adjacent to the incident surface. The frame includes at least one elastic element (5556) urging the light guide plate, thus keeping the incident surface in contact with the light source.

16 Claims, 5 Drawing Sheets

BACKLIGHT MODULE WITH URGED LIGHT GUIDE PLATE AND LIQUID CRYSTAL DISPLAY HAVING SAME

BACKGROUND

1. Field of the Invention

The present invention relates to a backlight module and a liquid crystal display (LCD) using the same.

2. General Background

LCDs are flat-panel displays which have excellent features including high resolution, physical thinness, light weight, and low power consumption. Their market size has expanded recently with improvements in display performance and production capacity as well as improvements in price competitiveness against other types of display devices.

A typical LCD is represented in FIG. 6. The LCD 300 includes a flexible printed circuit board (FPC) 310, a liquid crystal display panel 320, a frame 330, two light emitting diodes (LEDs) 340 cooperatively serving as a light source, and a light guide plate 400.

The FPC 310 includes a circuit region 311, and a light source accommodating region 312 for accommodating the two light sources 340. The circuit region 311 is electrically connected with the liquid crystal display panel 320. The accommodating region 312 is a strip portion extending from the circuit region 311. The frame 330 includes a depressed portion 331 having two cavities 332.

The LCD 300 is assembled according to the following steps. First, the light guide plate 400 is placed in the frame 330. Second, the accommodating region 312 with the two light sources 340 is placed in the depressed portion 331 of the frame 330, with the two LEDs 340 being received respectively in the two cavities 332. Third, the circuit region 311 of the FPC 310 is folded behind the frame 340 and the light guide plate 400. Finally, the liquid crystal display panel 320 is placed on the light guide plate 400, whereby the accommodating region 312 is sandwiched between the liquid crystal display panel 320 and the frame 330.

The liquid crystal display 300 has the following problems. First, due to limitations in manufacturing precision, the sizes of the cavities 332 are not exactly the same as those of the light sources 340. Consequently, gaps exist between the light sources 340 and the light guide plate 400, which affects the brightness of the light guide plate 400. Second, because the FPC 310 is bent, and the accommodating region 312 extends from the circuit region 311, the accommodating region 312 tends to be uneven. This results in a light emitting surface of each light source 340 facing an incident surface of the light guide plate 400 at an oblique angle. The oblique angles can diminish the uniformity of light output by the light guide plate 400.

FIG. 7 is a graph showing the negative impact of the above mentioned gaps on the effective utilization of light by the light guide plate 400. X represents the distance between the LEDs 340 and the incident surface (not labeled) of the light guide plate 400 in millimeters (mm), and Y represents the relative emitting luminance of the light guide plate 400. It is can be seen that the greater the value of X, the lower the value of Y. That is, the greater the gap, the lower the value of the relative emitting luminance.

Therefore, a new backlight module and liquid crystal display that can overcome the above-described problems are desired.

SUMMARY

In a preferred embodiment, a backlight module includes a light guide plate having an incident surface, a frame accommodating the light guide plate, and a light source accommodated in the frame and disposed adjacent to the incident surface. The frame includes at least one elastic element urging the light guide plate, thus keeping the incident surface in contact with the light source.

Other advantages and novel features will become more apparent from the following detailed description when taken in conjunction with the accompanying drawings.

DETAILED DESCRIPTION OF PREFERRED EMBODIMENTS

Figure 1:
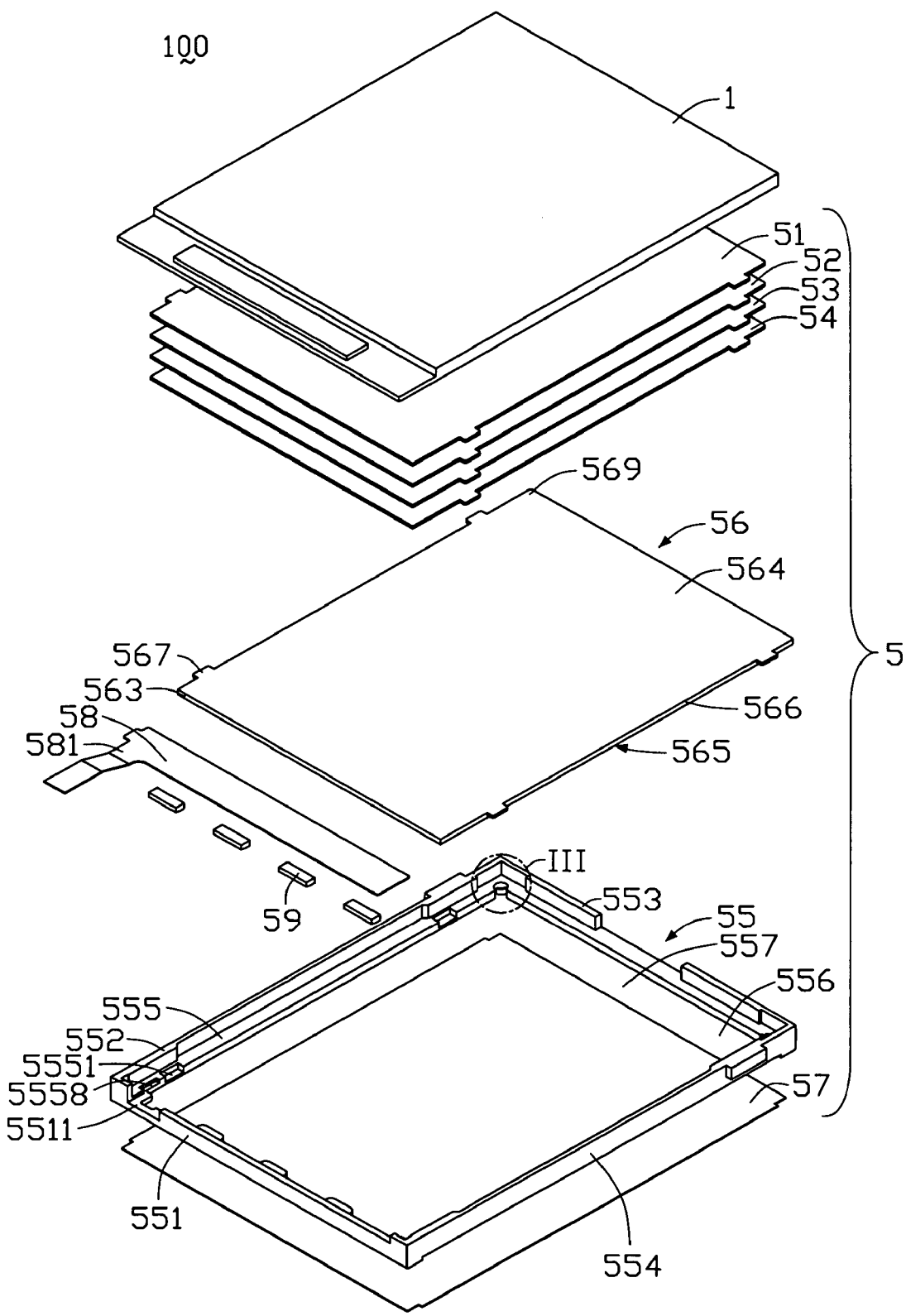
FIG. 1 is an exploded, isometric view of a liquid crystal display according to a preferred embodiment of the present invention, the liquid crystal display comprising an LCD panel, optical films, a light guide plate, a circuit board, light sources, a supporting frame, and a reflecting plate.

Referring to FIG. 1, a liquid crystal display 100 according to a preferred embodiment of the present invention includes a liquid crystal display panel 1 and a backlight module 5. The backlight module 5 is used to illuminate the liquid crystal display panel 1.

The backlight module 5 includes a first light diffusing film 51, a first brightness enhancing film 52, a second brightness enhancing film 53, a second light diffusing film 54, a frame 55, a light guide plate 56, a light reflecting plate 57, a circuit board 58, and a plurality of light sources 59. The first diffusing film 51, the first brightness enhancing film 52, the second brightness enhancing film 53, the second diffusing film 54, the light guide plate 56, and the reflecting plate 57 are accommodated in the frame 55, in that order from top to bottom. The light sources 59 are disposed on the circuit board 58, adjacent to the light guide plate 56.

The light guide plate 56 includes a light incident surface 563, a top surface 564 adjacent to the incident surface 563, a bottom surface 565 opposite to the top surface 564, and two opposite lateral side surfaces 566 adjacent to all the above surfaces. Each side surface 566 includes a pair of protrusions 567 extending therefrom. A thickness of each protrusion 567 is less than that of the light guide plate 56. A top surface (not labeled) of each protrusion 567 is level with the top surface 564. The first diffusing film 51, the first brightness enhancing film 52, the second brightness enhancing film 53, and the second diffusing film 54 include like protrusions at corresponding locations.

The frame 55 includes a four-sided supporting portion 555, and a first sidewall 551, a second sidewall 552, a third sidewall 553, and a fourth sidewall 554 all connecting end to end to cooperatively form a continuous peripheral upper wall. The supporting portion 555 defines a first accommodating space 556 therewithin. The four sidewalls 551, 552, 553, 554 and the supporting portion 555 cooperatively define a second accommodating space 557 therebetween.

The first sidewall 551 includes a first cutout 5511 defined thereat. The supporting portion 555 at the second sidewall 552 includes a pair of spaced apart first notches 5551, and a second notch 5558 adjacent to one of the first notches 5551 that is near the first cutout 5511. The first notches 5551 correspond to two of the protrusions 567 of the light guide plate 56. A size of each of the first notches 5551 is a little larger than that of each protrusion 567. The first notches 5551 are used to accommodate the protrusions 567 therein. The supporting portion 555 at the fourth sidewall 554 includes another pair of spaced apart first notches 5551 (not visible), and a second notch 5558 (not visible) adjacent to one of the first notches 5551 that is near the first sidewall 551. The first notches 5551 at the fourth sidewall 554 are used to accommodate a corresponding pair of protrusions 567 of the light guide plate 56 therein.

Figure 2:
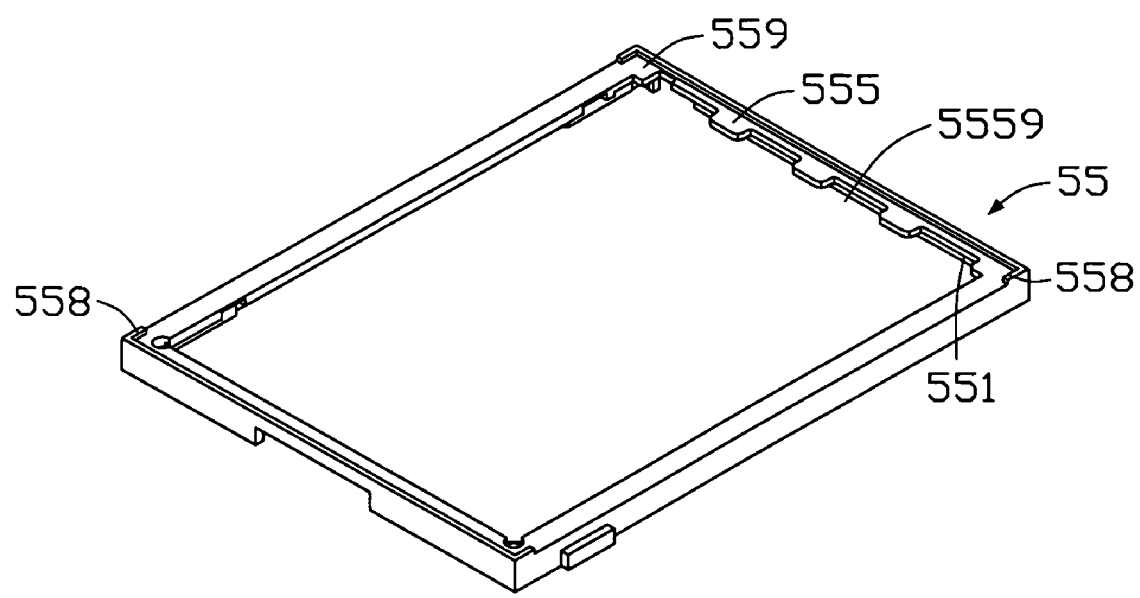
FIG. 2 is an isometric view of the supporting frame of FIG. 1 shown inverted.

FIG. 2 shows the frame 55 inverted. The frame 55 further includes two lower fifth sidewalls 558 extending down from the supporting portion 55. The fifth sidewalls 558 are located at opposite ends of the frame 55, below the first and third sidewalls 551, 553 respectively. The fifth sidewalls 558 and the supporting portion 555 cooperatively define a third accommodating space 559 therebetween. The supporting portion 555 defines a plurality of second cutouts 5559 at the first sidewall 551.

Figure 3:
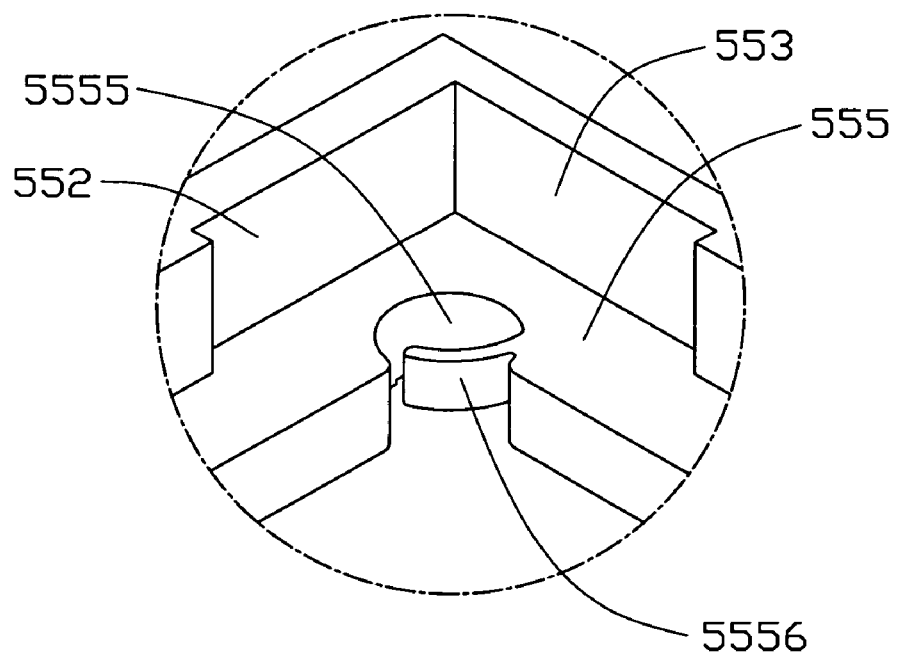
FIG. 3 is an enlarged view of a circled portion III of FIG. 1.

FIG. 3 is an enlarged view of a circled portion III of FIG. 1. The supporting portion 555 further includes two curved elastic elements 5556. The elastic elements 5556 are respectively located at the two adjacent corners of the supporting portion 555 at the third sidewall 553. The elastic elements 5556 may be made from rubber. In the illustrated embodiment, elastic elements 5556 are spring fingers. Each elastic element 5556 and the supporting portion 555 define a curved space 5555 therebetween.

Figure 4:
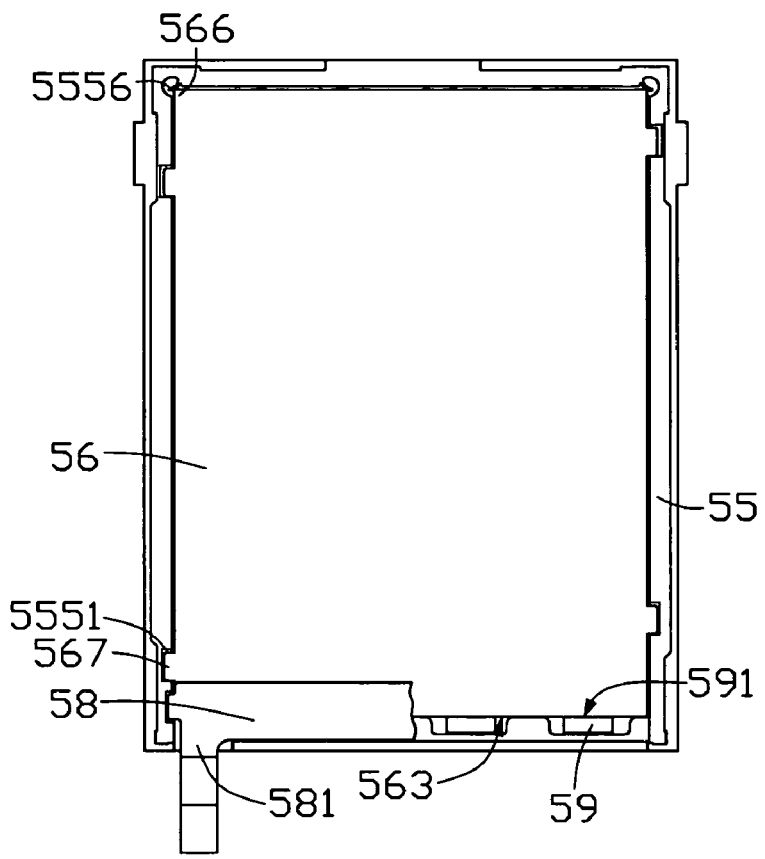
FIG. 4 is a top plan, cutaway view of the light guide plate, the circuit board, the light sources, the supporting frame, and the reflecting plate of FIG. 1 assembled together.

FIG. 4 is a top plan, cutaway view of the backlight module 5, but not showing the films 51, 52, 53, 54 thereof. In pre-assembly of the backlight module 5, the light guide plate 56 is accommodated in the first accommodating space 556, with the protrusions 567 being received in the first notches 5551 of the supporting portion 555. The circuit board 58 is also accommodated in the first accommodating space 556, with opposite ends of the circuit board 58 being received in the two opposite second notches 5558 of the supporting portion 555. The light sources 59 are accommodated in the second cutouts 5559. The lead strip 581 of the circuit board 58 extends out from the frame 55 via the first cutout 5511 of the first sidewall 551. The elastic elements 5556 urge two corners 569 of the light guide plate 56, thereby elastically keeping the incident surface 563 in contact with light emitting surfaces 591 of the light sources 59. Because a length of the first notches 5551 is greater than a corresponding length of the protrusions 567, when the elastic elements 5556 push the light guide plate 56, the protrusions 567 can slide within the first notches 5551. The curved space 5555 is used to receive the elastically deformed elastic elements 5556. The reflecting plate 57 is placed adjacent to the bottom surface 565 of the light guide plate 56, and is accommodated in the third accommodating space 559.

Also referring to FIG. 1, in further assembly of the backlight module 5, the first diffusing film 51, the first brightness enhancing film 52, the second brightness enhancing film 53, and the second diffusing film 54 are placed on the top surface 564. The films 51, 52, 53, 54 are thus accommodated in the second accommodating space 557, with the protrusions of the films 51, 52, 53, 54 being received in the first notches 5551 of the frame 55.

Figure 5:
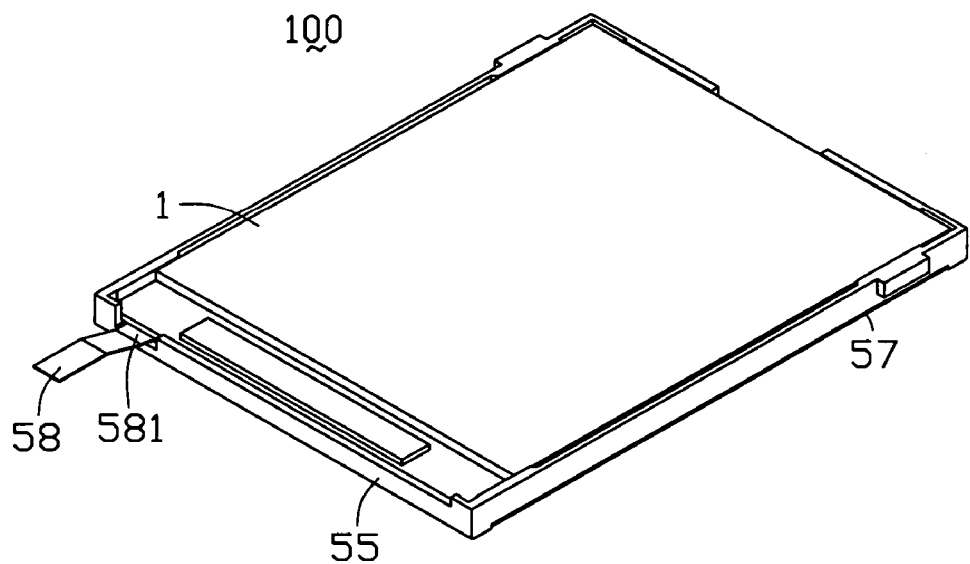
FIG. 5 is an assembled view of the liquid crystal display of FIG. 1.
Figure 6:
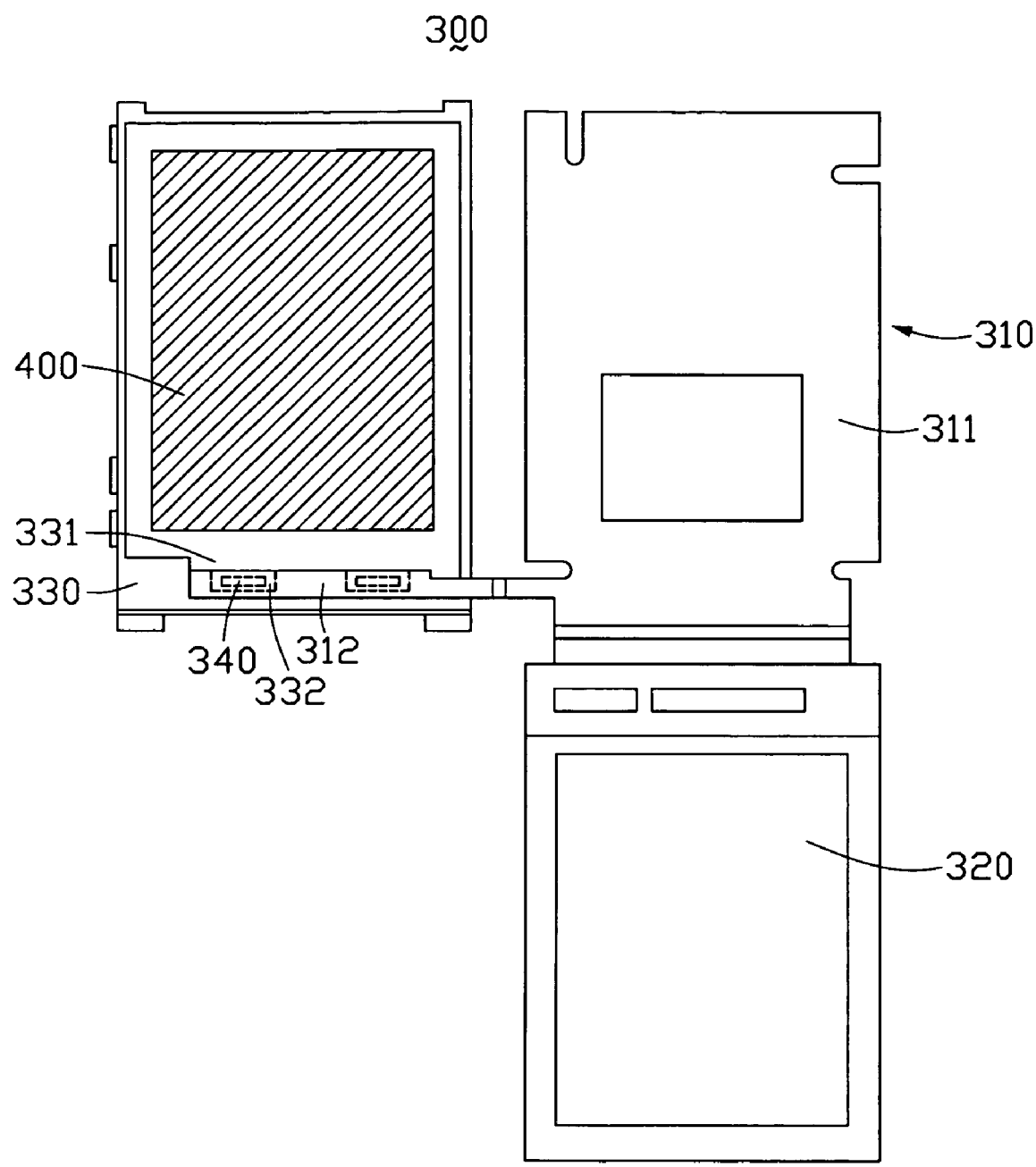
FIG. 6 is a schematic, top plan view of a conventional LCD device prior to assembly thereof, the LCD device comprising a light guide plate and LEDs, the light guide plate having an incident surface.
Figure 7:
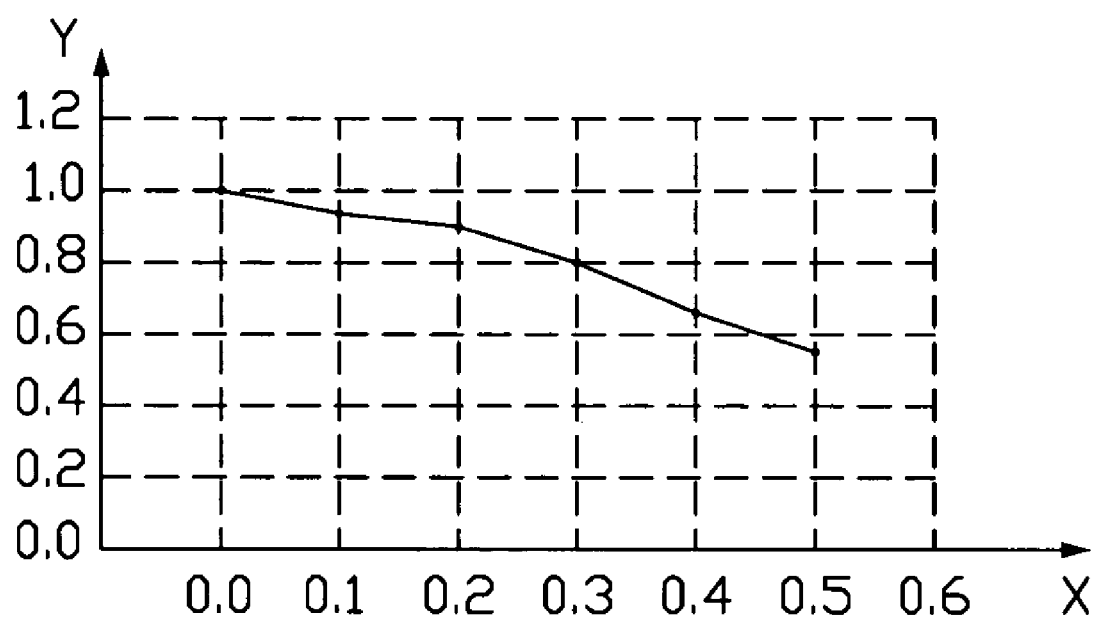
FIG. 7 is a graph showing the relative emitting luminance ("Y") of the light guide plate of FIG. 6 varying as a function of a distance ("X") between the LEDs and the incident surface of the light guide plate.

Referring to FIG. 5, in assembly of liquid crystal display 100, the liquid crystal display panel 1 is placed on the first diffusing film 51 and is thus accommodated in the second accommodating space 557 of the frame 55. The liquid crystal display panel 1 is thus attached to the backlight module 5, so that the liquid crystal display 100 is fully assembled.

The circuit board 58 may be a flexible printed circuit board, and is used to supply power for the light sources 59. The light sources 59 may be light emitting diodes. The frame 55 may be plastic.

The backlight module 5 includes the elastic elements 5556, which keep the light guide plate 56 in contact with the light sources 59. Thus any gaps between the light emitting surfaces 591 of the light sources 59 and the incident surface 563 of the light guide plate 56 are minimized or even eliminated. Therefore, the brightness of the backlight module 5 and the liquid crystal display 100 is enhanced. Furthermore, if the light emitting surfaces 591 of the light sources 59 are planar (see FIG. 4), the urging of the elastic elements 5556 minimizes or even eliminates any oblique angle that may exist between each light emitting surfaces 591 and the incident surface 563. Therefore, the brightness and the uniformity of output light of the backlight module 5 and the liquid crystal display 100 are improved.

Further and/or alternative embodiments may include the following. The elastic elements can be substantially rectilinear. The elastic elements 5556 can be located opposite from the incident surface 563 of the light guide plate 56, at a side of the supporting portion 555 adjacent the third sidewall 553. The elastic elements 5556 can be made from plastic or metal.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A backlight module comprising:
   a light guide plate having an light incident surface;
   a frame accommodating the light guide plate; an another surface opposite to the incident surface and
   a light source disposed adjacent to the light incident surface;
   wherein the frame comprises at least one elastic element urging the light guide plate, whereby the light incident surface contacts the light source said at least one elastic element located at a location selected from a group consisting of a side of the frame not facing the incident surface of the light guide, and at a corner of the frame defined by two sides of the frame not facing the incident surface of the light guide.

2. The backlight module as claimed in claim 1, wherein the elastic element is located at the side of the frame not facing the incident surface of the light guide.

3. The backlight module as claimed in claim 1, wherein the light guide plate includes a plurality of protrusions, and the frame includes a plurality of notches receiving the protrusions.

4. The backlight module as claimed in claim 3, wherein a length of the notches is greater than a corresponding length of the protrusions.

5. The backlight module as claimed in claim 1, wherein the frame includes a cutout accommodating the light source.

6. The backlight module as claimed in claim 1, further comprising a circuit board at least partly accommodated in the frame adjacent or near the light source.

7. The backlight module as claimed in claim 6, wherein the circuit board is a flexible printed circuit board.

8. The backlight module as claimed in claim 1, wherein the light source is a light emitting diode.

9. The backlight module as claimed in claim 1, wherein the elastic element is curved.

10. The backlight module as claimed in claim 1, wherein the elastic element is made from rubber.

11. The backlight module as claimed in claim 1, wherein the elastic element is made from plastic.

12. The backlight module as claimed in claim 1, wherein the elastic element is made from metal.

13. A liquid crystal display, comprising:
   a liquid crystal display panel; and
   a backlight module for illuminating the liquid crystal display panel, comprising:
      a light guide plate having an light incident surface;
      a frame accommodating the light guide plate; and
      a light source disposed adjacent to the light incident surface;
   wherein the frame comprises at least one elastic element urging the light guide plate, whereby the light incident surface contacts the light source.

14. The liquid crystal display as claimed in claim 13, wherein the elastic element is located at the side of the frame not facing the incident surface of the light guide.

15. The liquid crystal display as claimed in claim 13, wherein the light guide plate includes a plurality of protrusions, and the frame includes a plurality of notches accommodating the protrusions.

16. The liquid crystal display as claimed in claim 15, wherein a length of the notches is greater than a corresponding length of the protrusions.

* * * * *